US010513274B1

(12) United States Patent
Sung et al.

(10) Patent No.: US 10,513,274 B1
(45) Date of Patent: Dec. 24, 2019

(54) APPARATUS FOR NOTIFYING DRIVER OF STATUS INFORMATION OF SURROUNDING VEHICLE AND METHOD THEREOF

(71) Applicants: HYUNDAI MOTOR COMPANY, Seoul (KR); KIA MOTORS CORPORATION, Seoul (KR)

(72) Inventors: Ki Woo Sung, Suwon-si (KR); Hyeon Mok Lee, Jeollanam-do (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/162,630

(22) Filed: Oct. 17, 2018

(30) Foreign Application Priority Data

Jul. 26, 2018 (KR) ........................ 10-2018-0087008

(51) Int. Cl.
  *B60W 50/14* (2012.01)
  *H04W 4/46* (2018.01)
  *G05D 1/00* (2006.01)
  *B60R 1/00* (2006.01)

(52) U.S. Cl.
  CPC .............. *B60W 50/14* (2013.01); *B60R 1/00* (2013.01); *G05D 1/0061* (2013.01); *G05D 1/0088* (2013.01); *H04W 4/46* (2018.02); *B60R 2300/205* (2013.01); *B60R 2300/301* (2013.01); *B60W 2050/143* (2013.01); *B60W 2050/146* (2013.01); *B60W 2550/408* (2013.01); *G05D 2201/0213* (2013.01)

(58) Field of Classification Search
  CPC ......... G05D 1/0221; G05D 2201/0212; G05D 1/0088; B60W 2050/0089; B60W 50/14; H04W 4/46; B60R 1/10
  See application file for complete search history.

(56) References Cited

U.S. PATENT DOCUMENTS 9,766,626 B1 * 9/2017 Zhu ................... B60W 30/0956
2018/0074497 A1 * 3/2018 Tsuji ................... B60W 50/085

FOREIGN PATENT DOCUMENTS

KR            10-1830399 B1      3/2018

* cited by examiner

*Primary Examiner* — Omeed Alizada
(74) *Attorney, Agent, or Firm* — Brinks Gilson & Lione

(57) ABSTRACT

An apparatus and a method for notifying a driver of status information of a surrounding vehicle are provided to guide the driver to conduct defensive driving to provide safety by communicating with the surrounding vehicle which is located within a predetermined distance from a host vehicle on a road and is traveling in the same direction as the host vehicle. The apparatus notifies the driver whether the surrounding vehicle activates an autonomous mode. To this end, the apparatus includes: a V2V communication device to communicate with the surrounding vehicle to obtain information indicating whether the autonomous mode of the surrounding vehicle is activated; a display to display whether the autonomous mode is activated; and a controller to control the display using the information.

14 Claims, 9 Drawing Sheets

APPARATUS FOR NOTIFYING DRIVER OF STATUS INFORMATION OF SURROUNDING VEHICLE AND METHOD THEREOF

CROSS-REFERENCE TO RELATED APPLICATION

This application claims priority to and the benefit of Korean Patent Application No. 10-2018-0087008, filed on Jul. 26, 2018, the entire contents of which are incorporated herein by reference.

FIELD

The present disclosure relates to an apparatus for notifying a driver of status information of a surrounding vehicle and a method therefor.

BACKGROUND

The statements in this section merely provide background information related to the present disclosure and may not constitute prior art.

In technologies associated with a vehicle to vehicle (V2V) ad-hoc network, when a vehicle and a vehicle are located in a coverage area, they communicate with each other in a previously assigned frequency band (e.g., 5.9 GHz) and use wireless access in vehicular environments (WAVE) technology known as road-only communication technology among carrier sense multiple access/collision detection (CSMA/CD) based short-range wireless communication technologies.

A V2V system implemented in a vehicle may collect a variety of status information of the vehicle and may transmit the status information of the vehicle to another vehicle using the above-described communication technologies, thus receiving status information of the other vehicle. The status information received from the other vehicle may be used as target information considered to control the vehicle. Thus, the vehicle may inform the other vehicle of airbag deployment, a collision related event, path history information, or the like. The other vehicle may perform proper control accordingly.

Meanwhile, recently, autonomous vehicles have been developed. An autonomous vehicle controls respective devices therein, including a steering system, to recognize road environments itself, determine driving contexts, and move from a current location to a target location along a scheduled driving path.

To implement such autonomous driving, there is a need for autonomous emergency braking (AEB), a forward collision warning system (FCW), adaptive cruise control (ACC), a lane departure warning system (LDWS), a lane keeping assist system (LKAS), blind spot detection (BSD), a rear-end collision warning system (RCW), a smart parking assist system (SPAS), and the like.

Autonomous technology may be divided into four steps like Table 1 below.

TABLE 1

| Step | Classification | Description |
| --- | --- | --- |
| 0 | No Automation | Driver in complete and sole control at all times |
| 1 | Function-specific Automation | Driver can regain control or stop faster than if driving without the special function |
| 2 | Combined Function Automation | Driver is temporarily relieved of these driving functions |
| 3 | Limited Self-Driving Automation | Driver must be available to take over controls |
| 4 | Full Self-Driving Automation | Driver not expected to take control at any time |

Current autonomous technology reaches at the third step (i.e., Step 3) and tries to jump up to the fourth step (i.e., Step 4).

SUMMARY

An aspect of the present disclosure provides an apparatus for notifying a driver of status information of a surrounding vehicle to guide the driver to conduct defensive driving to provide safety by communicating with the surrounding vehicle which is located within a predetermined distance from a host vehicle on a road and is traveling in the same direction as the host vehicle and notify the driver whether the surrounding vehicle activates an autonomous mode and a method therefor.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus may include: a first communication device configured to communicate with the surrounding vehicle and to obtain information indicating whether an autonomous mode of the surrounding vehicle is activated, a display configured to display whether the surrounding vehicle activates the autonomous mode, and a controller configured to control the display based on the information indicating whether the autonomous mode is activated.

The display may include: side mirrors, each of which includes a display and a half mirror; and a head up display (HUD).

The apparatus may further include: a sensor device configured to sense a relative location of the surrounding vehicle to the host vehicle; and a storage configured to store information of the relative location to be displayed on each side mirror of the side mirrors and on a windshield. The controller may be configured to determine a first location corresponding to the relative location of the surrounding vehicle on each side mirror of the side mirrors, or a second location corresponding to the relative location of the surrounding vehicle on the windshield.

The controller may be configured to display an icon with a predetermined color to indicate whether the surrounding vehicle activates the autonomous mode.

The apparatus may further include a mobile communication device configured to obtain additional information of the surrounding vehicle from a server. The controller may be configured to calculate a risk level of the surrounding vehicle using the additional information obtained through the mobile communication device. The controller may be configured to control the display to display whether the surrounding vehicle activates the autonomous mode together with the risk level.

The controller may be configured to adjust a size of an icon indicating whether the surrounding vehicle activates the autonomous mode based on the risk level.

The additional information may be an accident history of the surrounding vehicle, an accident history and an age of a driver of the surrounding vehicle, and an accident history, an age of the driver, and a vehicle age of the surrounding vehicle.

The controller may be configured to notify the driver of the number of surrounding vehicles which are traveling in the autonomous mode, using a voice.

According to another aspect of the present disclosure, a method may include: communicating, by a vehicle to vehicle (V2V) communication device, with the surrounding vehicle and obtaining information indicating whether an autonomous mode of the surrounding vehicle is activated; selecting, by a controller of the surrounding vehicle, at least one of a side mirror or a head up display (HUD); displaying, by the side mirror, whether the surrounding vehicle activates the autonomous mode, when the side mirror is selected, and displaying, by the HUD, whether the surrounding vehicle activates the autonomous mode, when the HUD is selected.

The selecting at least one of the side mirror or the HUD may include: sensing, by a sensor device, a relative location of the surrounding vehicle with respect to the host vehicle; storing, by a storage, information of the relative location to be displayed on the side mirror and on a windshield; and determining, by the controller, a first location corresponding to the relative location of the surrounding vehicle on the side mirror or a second location corresponding to the relative location of the surrounding vehicle on the windshield.

The method may further include providing the driver of the host vehicle with a number of surrounding vehicles which are traveling in the autonomous mode, using a voice.

According to another aspect of the present disclosure, a method may include: communicating, by a V2V communication device, with the surrounding vehicle and obtaining information indicating whether an autonomous mode of the surrounding vehicle is activated; obtaining, by a first communication device, additional information of the surrounding vehicle from a server; calculating, by a controller of the host vehicle, a risk level of the surrounding vehicle using the obtained additional information; selecting, by the controller, at least one of a side mirror or a head up display (HUD); displaying, by the side mirror, whether an icon indicating whether the surrounding vehicle activates the autonomous mode together with the risk level, when the side mirror is selected, and displaying, by the HUD, whether an icon indicating whether the surrounding vehicle activates the autonomous mode together with the risk level, when the HUD is selected.

The method may further include adjusting, by the controller, a size of the icon indicating whether the surrounding vehicle activates the autonomous mode based on the risk level.

The additional information may be an accident history of the surrounding vehicle, an accident history and an age of the driver of the surrounding vehicle, and/or an accident history, an age of the driver, and a vehicle age of the surrounding vehicle.

The method may further include notifying, by the controller, the driver of the number of surrounding vehicles which are traveling in the autonomous mode, using a voice.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
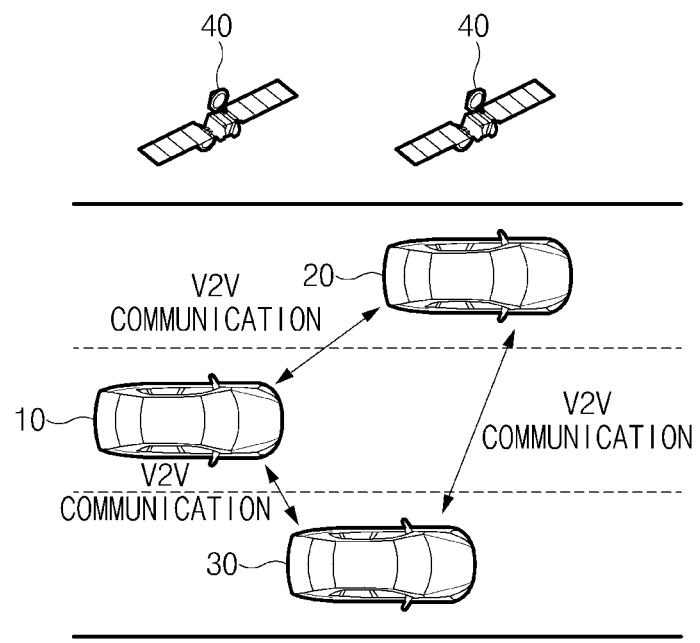
FIG. 1 is a drawing illustrating an environment where a host vehicle and surrounding vehicles are traveling.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In adding reference denotations to elements of each drawing, although the same elements are displayed on a different drawing, it should be noted that the same elements have the same denotations.

In addition, in describing exemplary forms of the present disclosure, if it is determined that a detailed description of related well-known configurations or functions blurs the gist of the present disclosure, it will be omitted.

In describing elements of the forms of the present disclosure, the terms $1^{st}$, $2^{nd}$, first, second, A, B, (a), (b), and the like may be used herein. These terms are only used to distinguish one element from another element, but do not limit the corresponding elements irrespective of the nature, turn, or order of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a drawing illustrating an environment where a host vehicle and surrounding vehicles, to which one form of the present disclosure is applied, are traveling.

As shown in FIG. 1, a host vehicle 10 and surrounding vehicles 20 and 30 may perform vehicle to vehicle (V2V) communication therebetween to exchange a variety of information and may receive a global positioning system (GPS) satellite signal from a GPS satellite 40.

In FIG. 1, as one exemplary form, there are the two surrounding vehicles 20 and 30. However, forms are not limited thereto. For example, there may an additional preceding vehicle which is traveling on the same lane as the host vehicle 10, or there may be a vehicle (a following vehicle) which is traveling behind the host vehicle 10. In this case, a driver may identify the following vehicle through a side mirror of the host vehicle 10 or may identify the preceding vehicle through a windshield of the host vehicle 10.

Figure 2:
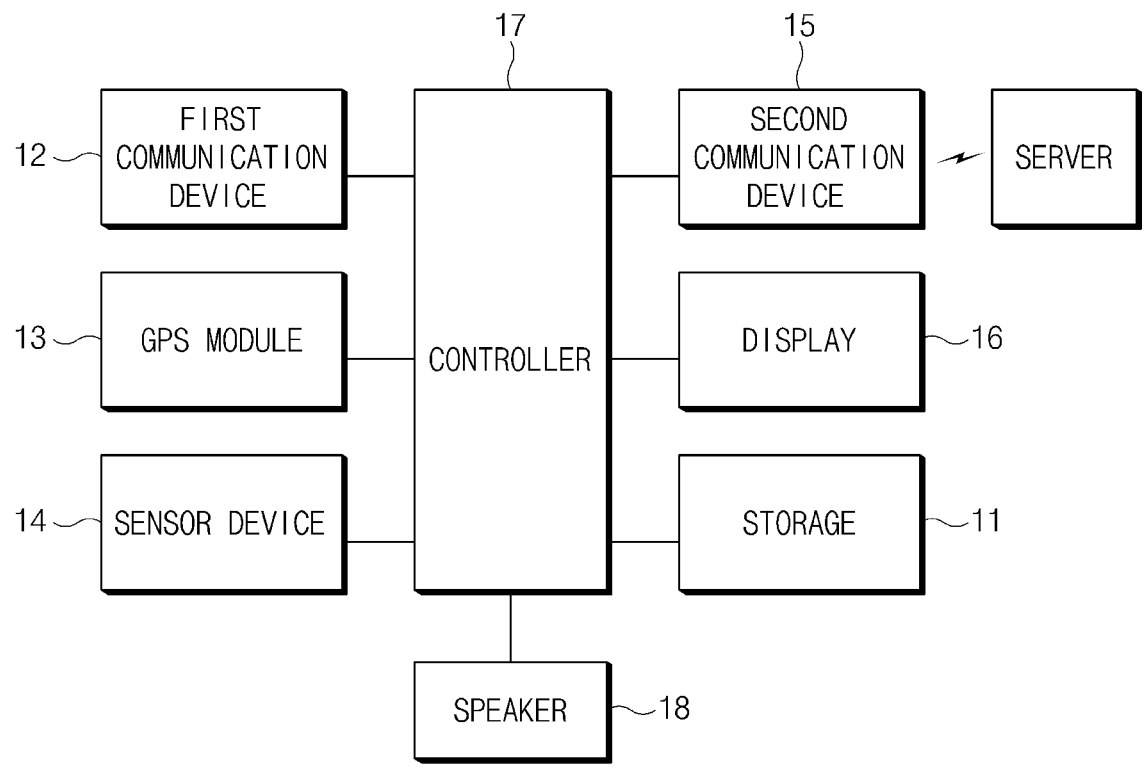
FIG. 2 is a block diagram illustrating an apparatus for notifying a driver of status information of a surrounding vehicle.

FIG. 2 is a block diagram illustrating an apparatus for notifying a driver of status information of a surrounding vehicle in one form of the present disclosure.

The apparatus for notifying the driver of the status information of the surrounding vehicle may include: a storage 11, a first communication device 12, a GPS module 13, a sensor device 14, a second communication device 15, a display 16, and a controller 17. The components may be integrated into one component according to a manner of implementing the present disclosure, and some of the components may be omitted according to the manner of implementing the present disclosure.

Seeing the respective components, first of all, the storage 11 may store various logics and programs desired to communicate with surrounding vehicles 20 and 30 of FIG. 1 and notify a driver of a host vehicle 10 of FIG. 1 whether the surrounding vehicles 20 and 30 activate an autonomous mode.

Furthermore, the storage 11 may store various logics and programs desired to perform V2V communication with the surrounding vehicles 20 and 30 to collect information indicating whether the autonomous mode is activated and display the collected information on a windshield or side mirror of the host vehicle 10.

Furthermore, the storage 11 may store various logics and programs desired to calculate a risk level based on information about the surrounding vehicles 20 and 30, collected by means of V2V communication, and information (e.g., accident history, driver age, driver gender, vehicle age, or the like) about the surrounding vehicles 20 and 30, collected through mobile communication, and display the calculated risk level on the windshield or the side mirror of the host vehicle 10.

In addition, the storage 11 may store information about a relative location of each of the surrounding vehicles 20 and 30 with respect to the host vehicle, a location corresponding to the relative location to be displayed on a left/right side mirror, and a location corresponding to the relative location to be displayed on the windshield. Such location information may be obtained through a pre-test. In other words, the storage 11 may store the location information generated through a process of matching a relative location of each of the surrounding vehicles 20 and 30 with a location of a surrounding vehicle on the side mirror and a location of each of the surrounding vehicles 20 and 30 on the windshield at a view point of a driver.

Such a storage 11 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The first communication device 12 may be a module having a V2V communication interface and may communicate with the surrounding vehicles 20 and 30 to obtain a variety of information. In this case, the information may be vehicle information and may include a vehicle identification number, information indicating whether an autonomous mode is activated, or the like.

The GPS module 13 may receive a GPS satellite signal from a GPS satellite 40 of FIG. 1 and may generate location information of the host vehicle 10.

Such a GPS module 13 may generate GPS information including GPS location coordinates, a forward direction, a current speed, or the like of the host vehicle 10. In this case, the GPS location coordinates may be extracted through the GPS module 13. The forward direction may be obtained by extracting a movement direction of the host vehicle 10 as an absolute angle. The current speed may be checked from the GPS module 13 or a speedometer of the host vehicle 10.

The sensor device 14 may include an ultrasonic sensor, a radar sensor, a laser sensor, or the like and may sense a relative distance between the host vehicle 10 and the surrounding vehicles 30 and 40.

Furthermore, the sensor device 14 may sense a relative location of each of the surrounding vehicles 30 and 40 with respect to the host vehicle 10.

The second communication device 15 may be a module having a mobile communication interface and may communicate with an external insurance company server (not shown) to obtain accident history, driver age, driver gender, vehicle age, or the like of each of the surrounding vehicles 20 and 30.

The display 16 may include and side mirrors and an HUD. Herein, the side mirrors may refer to mirrors which allow the driver to view a vehicle located behind the left/right of the host vehicle 10.

Hereinafter, a description will be given of a manner of displaying information on side mirrors and an HUD with reference to FIGS. 3 and 4.

Figure 3:
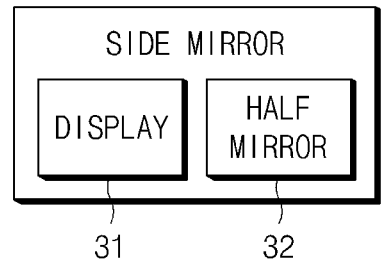
FIG. 3 is a block diagram illustrating a side mirror having an information display function.

FIG. 3 is a block diagram illustrating a side mirror having an information display function used for one form of the present disclosure. The side mirror may include a display 31 and a half mirror 32 and may have a structure where the half mirror 32 is covered on a front surface of the display 31. The half mirror 32 may be a mirror made to reflect a part of light and transmit the other. It may be common that reflectivity and transmissivity are fifty-fifty. Furthermore, the display 31 may be implemented as a light emitting diode/liquid crystal display (LED/LCD) type display.

Figure 4:
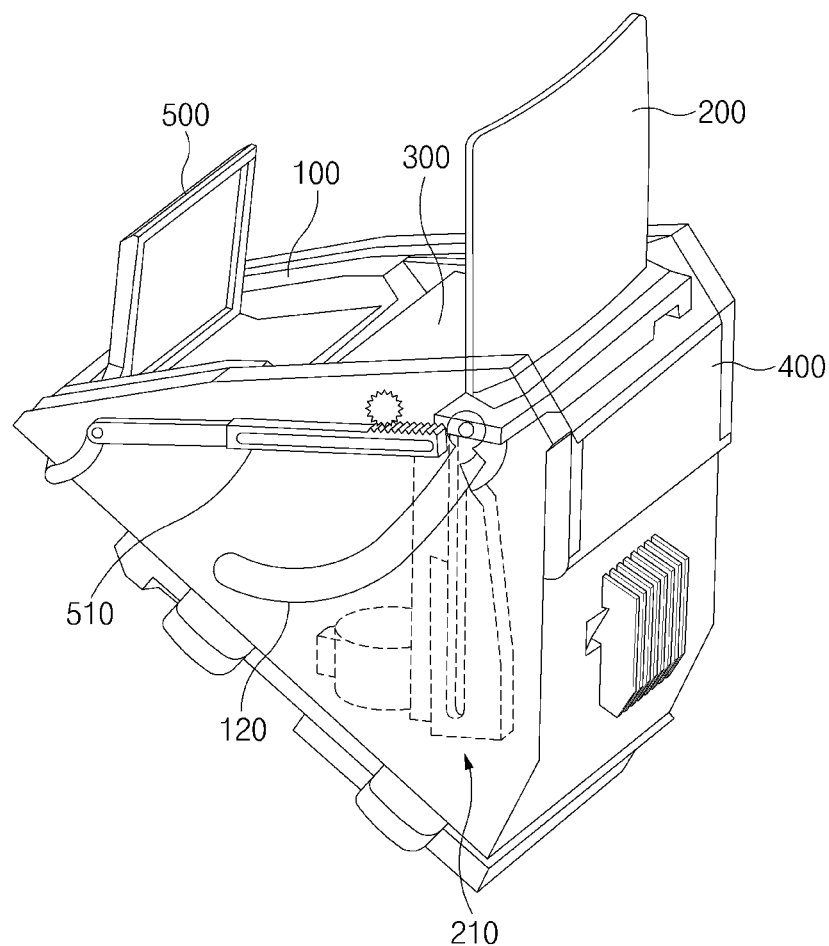
FIG. 4 is a drawing illustrating a head up display (HUD)

FIG. 4 is a drawing illustrating an HUD used for one form of the present disclosure. The HUD may include a housing 100 equipped with a display (not shown) which generates a video, a combiner 200 installed in the housing 100 to rise and fall, a first cover 300 and a second cover 400 interlocked with the combiner 200 to be openable and closable, and a mirror 500 interlocked with the first cover 300 to be rotatable.

As shown in FIG. 4, the housing 100 may be inserted and mounted in a dashboard (not shown) of a vehicle. A space may be formed in the housing 100 to allow the combiner 200 to be described below to rise and fall. A plurality of openings may be formed in an upper surface of the housing 100 to allow the first cover 200, the second cover 400, and the mirror 500 to be opened and closed.

The display may be mounted in the housing 100 to generate an image or video. In one form, the display may be located at a side surface or a lower portion in the housing 100 such that the combiner 200 is not influenced when rising and falling. In this case, the display may be connected to an electronic control unit (ECU) which performs an overall electronic control function to receive a variety of information associated with a vehicle, such as a traveling speed and an engine state of the vehicle, and generate an image or video. Furthermore, when the display is connected with a device such as a navigation terminal, it may receive a variety of location information associated with a movement path to a specific destination and may generate an image or video. Moreover, the display may display whether a surrounding vehicle activates an autonomous mode, a risk level, and the like under control of a controller 17 of FIG. 2.

The combiner 200 may be provided to rise and fall in an upward and downward direction from the housing 100. When the HUD is not used, the combiner 200 may move in a downward direction to be located in the housing 100. When the HUD is used, the combiner 200 may move in an upward direction to protrude to an upper portion of the housing 100. An image or video generated from the display may be reflected through the mirror 500 to be described and may then be irradiated to the combiner 200. Thus, a user may verify vehicle information without a separate display such as a navigation device.

In this case, an aspheric lens may be applied to the combiner 200 to enhance focus accuracy of a subject such that an irradiated image or video for vehicle information may be clear. The image or video may be focused on the combiner 200 to be seen as a virtual image located a certain distance ahead of a driver.

Such an HUD may display a variety of information on the entire region of a windshield of a host vehicle 10 of FIG. 1.

The controller 17 may perform overall control such that the respective components perform their function normally. Such a controller 17 may be implemented in the form of hardware or software or may be implemented in the form of a combination thereof. In one form, the controller 17 may be implemented as, but not limited to, a microprocessor.

Such a controller 17 may control all processes of communicating with a vehicle (hereinafter referred to as "surrounding vehicle") which is located within a constant distance from the host vehicle 10 on a road and is traveling in the same direction as the host vehicle 10 and notifying the driver whether the surrounding vehicle activates an autonomous mode. In this case, the surrounding vehicle may be classified as a preceding vehicle capable of being identified through a windshield of the host vehicle 10 or a following vehicle capable of being identified through a side mirror of the host vehicle 10.

Furthermore, the controller 17 may control all processes of performing V2V communication with the surrounding vehicle, collecting information indicating whether an autonomous mode is activated, and displaying the collected information on the windshield or the side mirror.

Furthermore, the controller 17 may control all processes of calculating a risk level based on information (e.g., a vehicle identification number, a vehicle number, or the like) of the surrounding vehicle, collected by means of V2V communication, and information (e.g., accident history, driver age, driver gender, vehicle age, or the like) of the surrounding vehicle, collected by means of mobile communication, and displaying the calculated risk level on the windshield or the side mirror.

Particularly, the controller 17 may control all processes of obtaining information indicating whether the autonomous mode is activated and location information (location information of the surrounding vehicle which communicates with a first communication device 12 of FIG. 2) from the surrounding vehicle via the first communication device 12, specifying the surrounding vehicle on a display 16 of FIG. 2 based on location information of the host vehicle 10, obtained through a GPS module 13 of FIG. 2, and a relative location of the surrounding vehicle (a relative location with respect to the host vehicle 10), obtained using a sensor device 14 of FIG. 2, and displaying whether the autonomous mode is activated on a location corresponding to the specified surrounding vehicle on the display 16. In this case, the controller 17 may precede a process of specifying whether a display to display whether the autonomous mode is activated is a left side mirror, a right side mirror, or an HUD and specifying the surrounding vehicle on the specified display. Technology of specifying whether a driver identifies a surrounding vehicle on a left side mirror, a right side mirror, or a windshield based on a relative location of the surrounding vehicle and technology of specifying the surrounding vehicle on the specified display are well-known and commonly used, so the detailed description will be omitted.

Figure 5:
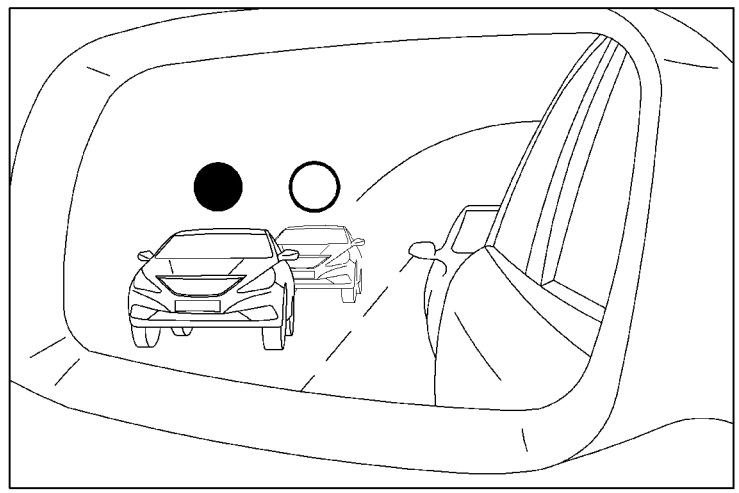
FIG. 5 is a drawing illustrating a state where an apparatus for notifying a driver of status information of a surrounding vehicle notifies the driver whether the surrounding vehicle activates an autonomous mode through a side mirror.
Figure 6:
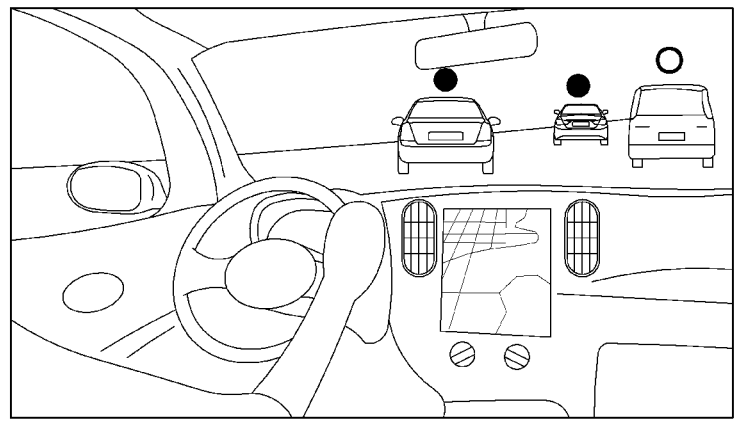
FIG. 6 is a drawing illustrating a state where an apparatus for notifying a driver of status information of a surrounding vehicle notifies the driver whether the surrounding vehicle activates an autonomous mode through an HUD.

FIG. 5 is a drawing illustrating a state where an apparatus for notifying a driver of status information of a surrounding vehicle notifies the driver whether the surrounding vehicle activates an autonomous mode through a side mirror, in one form of the present disclosure. FIG. 6 is a drawing illustrating a state where an apparatus for notifying a driver of status information of a surrounding vehicle notifies the driver whether the surrounding vehicle activates an autonomous mode through an HUD, in another form of the present disclosure. As shown in FIGS. 5 and 6, a controller 17 of FIG. 2 may display whether an autonomous mode is activated, using an icon (e.g., a circle) having a predetermined color. For example, activation may be displayed in red, and deactivation may be displayed in blue.

Meanwhile, the controller 17 may obtain additional information (e.g., accident history, driver age, driver gender, vehicle age, or the like) of a surrounding vehicle from an external insurance company server via a second communication device 15 of FIG. 2 and may calculate a risk level of the surrounding vehicle. An exemplary form of the present disclosure is exemplified as there is the external insurance company server. However, forms are not limited thereto. For example, there may be any server capable of providing additional information of a surrounding vehicle.

For example, the controller 17 may calculate a risk level like Table 2 below in a manner to calculate the risk level using only accident history.

TABLE 2

| The number of average annual accidents | Risk level (%) |
|---|---|
| less than 0.3 | 10 |
| less than 0.3-0.6 | 30 |
| less than 0.6-0.9 | 50 |
| less than 0.9-1.2 | 70 |
| 1.2 or more | 90 |

For another example, the controller 17 may calculate a risk level based on accident history and driver age. In other words, the controller 17 may use a manner to change the risk level in Table 2 above in consideration of driver age. For example, when driver age is less than 50, the controller 17 may fail to consider the driver age. For example, when the driver age is between 50 and 60, the controller 17 may add 2% to the risk level in Table 2 above. In other words, the risk level in Table 2 above may change to 12, 32, 52, 72, and 92. For example, when the driver age is between 60 and 65, the controller 17 may add 3% to the risk level in Table 2 above. In other words, the risk level in Table 2 above may change to 13, 33, 53, 73, and 93. For example, when the driver age is between 65 and 70, the controller 17 may add 5% to the risk level in Table 2 above. In other words, the risk level in Table 2 above may change to 15, 35, 55, 75, and 95. For example, when the driver age is greater than or equal to 70, the controller 17 may add 7% to the risk level in Table 2 above. In other words, the risk level in Table 2 above may change to 17, 37, 57, 77, and 97.

For another example, the controller 17 may calculate a risk level based on accident history, driver age, and vehicle age. In other words, the controller 17 may use a manner to change a risk level in consideration of driver age and vehicle age. For example, when vehicle age is between 10 and 15, the controller 17 may add 1% to a risk level changed in consideration of the driver age. As described above, when the driver age is 70, the risk level may be 17, 37, 57, 77, and 97. Herein, when vehicle age is 13, the controller 17 may add 1 to the risk level of 17, 37, 57, 77, and 97. Thus, the risk level may change to 18, 38, 58, 78, and 98. For example, when the vehicle age is greater than 15, the controller 17 may add 2% to the risk level changed in consideration of the driver age. In other words, the controller 17 may add 2 to the risk level of 17, 37, 57, 77, and 97. Thus, the risk level may change to 19, 39, 59, 79, and 99.

Figure 7:
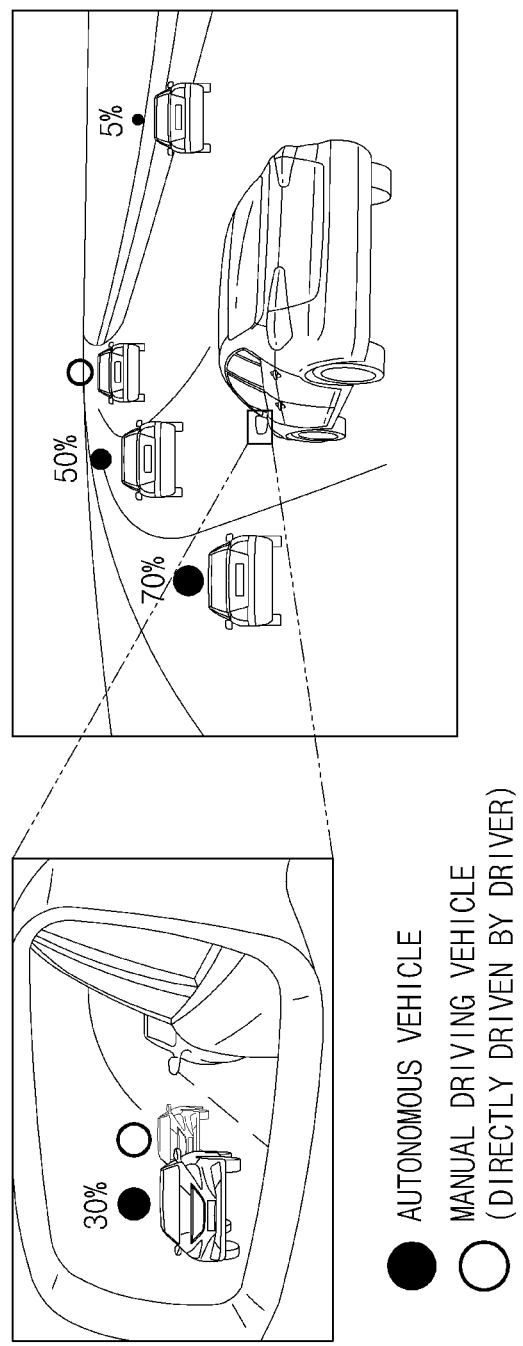
FIG. 7 is a drawing illustrating a state where an apparatus for notifying a driver of status information of a surrounding vehicle adjusts a size of an icon indicating whether an autonomous mode is activated in proportion to a risk level.

FIG. 7 is a drawing illustrating a state where an apparatus for notifying a driver of status information of a surrounding vehicle adjusts a size of an icon indicating whether an autonomous mode is activated in proportion to a risk level, in one form of the present disclosure. As shown in FIG. 7, a controller 17 of FIG. 2 may control a display 16 of FIG. 2 to display whether a surrounding vehicle activates an autonomous mode together with a risk level of the surrounding vehicle or may control the display 16 to display only the risk level of the surrounding vehicle. In this case, the controller 17 may associate whether the autonomous mode is activated with the risk level. When the risk level is high, the controller 17 may set an icon indicating whether the autonomous mode is activated to a large size. When the risk level is low, the controller 17 may set the icon indicating whether the autonomous mode is activated to a small size. In other words, the controller 17 may adjust the size of the icon indicating whether the autonomous mode is activated, in proportion to the risk.

Meanwhile, the controller 17 may notify a driver of the number of vehicles which are traveling in the autonomous mode around a host vehicle 10 of FIG. 1, using a voice through a speaker 18 of FIG. 2. In other words, the controller 17 may notify the driver of the number of surrounding vehicles which are traveling in the autonomous mode, using a voice.

Figure 8:
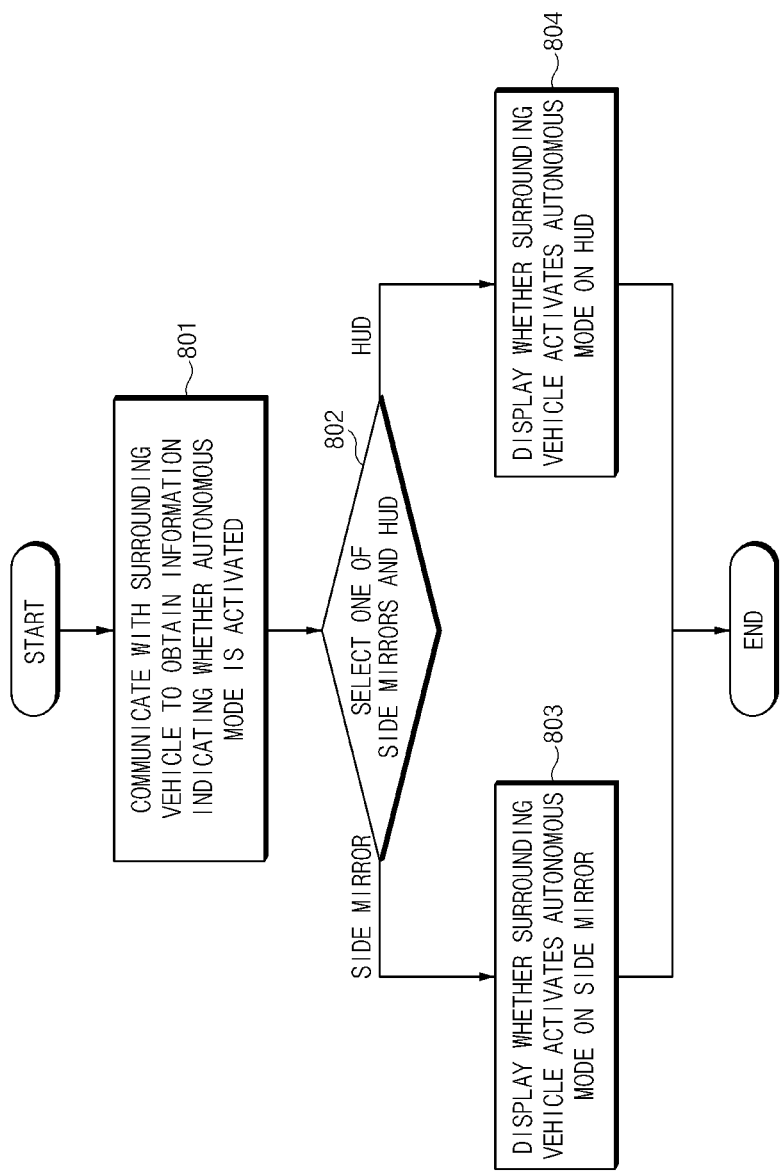
FIG. 8 is a flowchart illustrating a method for notifying a driver of status information of a surrounding vehicle.

FIG. 8 is a flowchart illustrating a method for notifying a driver of status information of a surrounding vehicle in one form of the present disclosure.

First of all, in operation 801, a first communication device (e.g., a V2V communication device) 12 may communicate with a surrounding vehicle to obtain information indicating whether an autonomous mode is activated.

In operation 802, the controller 17 may select one of side mirrors and an HUD. In this case, the controller 17 may select one of a left side mirror, a right side mirror, and the HUD based on a relative location of the surrounding vehicle.

When the side mirror is selected in operation 802, in operation 803, it may display whether the surrounding vehicle activates the autonomous mode. In this case, the controller 17 may determine a location to display whether the surrounding vehicle activates the autonomous mode on the side mirror.

When the HUD is selected in operation 802, in operation 804, it may display whether the surrounding vehicle activates the autonomous mode. In this case, the controller 17 may determine a location to display whether the surrounding vehicle activates the autonomous mode on the HUD.

Figure 9:
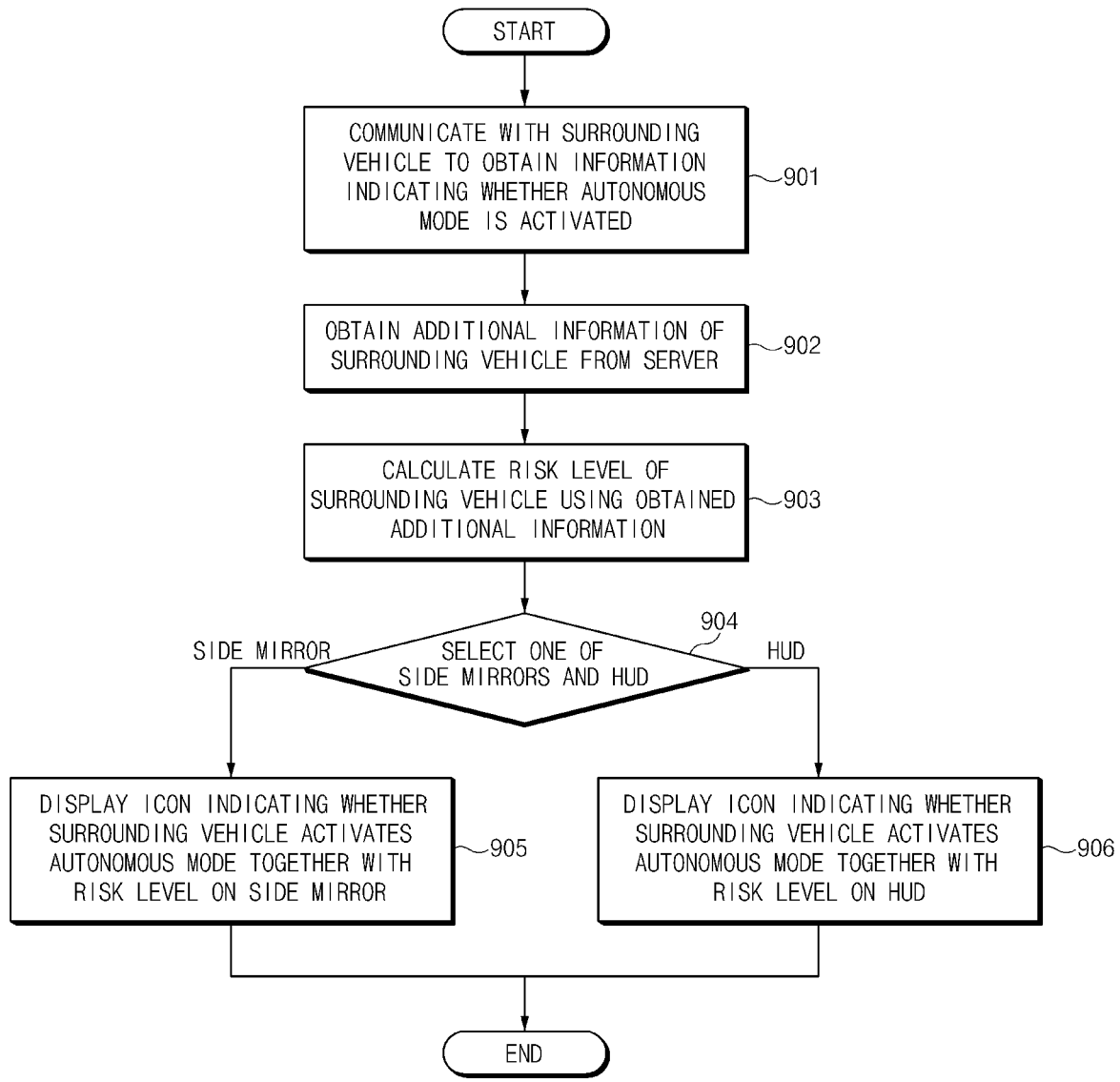
FIG. 9 is a flowchart illustrating a method for notifying a driver of status information of a surrounding vehicle.

FIG. 9 is a flowchart illustrating a method for notifying a driver of status information of a surrounding vehicle in another form of the present disclosure.

First of all, in operation 901, a first communication device (e.g., a V2V communication device) 12 may communicate with a surrounding vehicle to obtain information indicating whether an autonomous mode is activated.

In operation 902, a second communication device (e.g., a mobile communication device) 15 may obtain additional information of the surrounding vehicle from a server.

In operation 903, the controller 17 may calculate a risk level of the surrounding vehicle using the additional information obtained by the mobile communication device 15.

In operation 904, the controller 17 may select one of side mirrors and an HUD. In this case, the controller 17 may select one of a left side mirror, a right side mirror, and the HUD based on a relative location of the surrounding vehicle.

When the side mirror is selected in operation 904, in operation 905, it may display an icon indicating whether the surrounding vehicle activates the autonomous mode together with the risk. In this case, the controller 17 may determine a location to display the icon indicating whether the surrounding vehicle activates the autonomous mode and the risk on the side mirror.

When the HUD is selected in operation 904, in operation 906, it may display an icon indicating whether the surrounding vehicle activates the autonomous mode together with the risk. In this case, the controller 17 may determine a location to display the icon indicating whether the surrounding vehicle activates the autonomous mode and the risk on the HUD.

The exemplary forms of the present disclosure may guide the driver to conduct defensive driving to ensure safety by communicating with a surrounding vehicle which is located within a predetermined distance from a host vehicle on a road and is traveling in the same direction as the host vehicle and notifying the driver whether the surrounding vehicle activates an autonomous mode.

Furthermore, the present disclosure may allow a driver to recognize whether a surrounding vehicle performs autonomous driving with high visibility by performing V2V communication with the surrounding vehicle to collect information indicating whether an autonomous mode is activated and displaying the collected information on a windshield or a side mirror of a host vehicle.

Furthermore, the present disclosure may guide a driver to perform strong defensive driving by calculating a risk level based on information of a surrounding vehicle, collected by means of V2V communication, and information (e.g., accident history, driver age, driver gender, vehicle age, or the like) of the surrounding vehicle, collected by means of mobile communication, and displaying the calculated risk level on a windshield or a side mirror of a host vehicle.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. An apparatus for providing a driver of a host vehicle with status information of a surrounding vehicle, the apparatus comprising:
    a first communication device configured to communicate with the surrounding vehicle and to obtain information indicating whether an autonomous mode of the surrounding vehicle is activated;
    a display configured to display whether the surrounding vehicle activates the autonomous mode;
    a controller configured to control the display based on the information indicating whether the autonomous mode is activated; and
    a second communication device configured to obtain additional information of the surrounding vehicle from a server,
    wherein the controller is configured to calculate a risk level of the surrounding vehicle based on the additional information obtained through the second communication device, and
    wherein the additional information include at least one of an accident history, an age of a driver, or a vehicle age of the surrounding vehicle.

2. The apparatus of claim 1, wherein the display comprises:
    side mirrors, each of which includes a display and a half mirror; and
    a head up display (HUD).

3. The apparatus of claim 2, further comprising:
    a sensor device configured to sense a relative location of the surrounding vehicle to the host vehicle; and
    a storage configured to store information of the relative location to be displayed on each side mirror of the side mirrors and on a windshield.

4. The apparatus of claim 3, wherein the controller is configured to:
    determine a first location corresponding to the relative location of the surrounding vehicle on each side mirror of the side mirrors, or a second location corresponding to the relative location of the surrounding vehicle on the windshield.

5. The apparatus of claim 1, wherein the controller is configured to:
    display an icon with a predetermined color to indicate whether the surrounding vehicle activates the autonomous mode.

6. The apparatus of claim 1, wherein the controller is configured to:
    control the display to display whether the surrounding vehicle activates the autonomous mode together with the risk level.

7. The apparatus of claim 6, wherein the controller is configured to:
    adjust a size of an icon indicating whether the surrounding vehicle activates the autonomous mode based on the risk level.

8. The apparatus of claim 1, wherein the controller is configured to:
    provide the driver of the host vehicle with a number of surrounding vehicles which are traveling in the autonomous mode, using a voice.

9. A method for notifying a driver of status information of a surrounding vehicle, the method comprising:
    communicating, by a vehicle to vehicle (V2V) communication device, with the surrounding vehicle and obtaining information indicating whether an autonomous mode of the surrounding vehicle is activated;
    obtaining, by a first communication device, additional information of the surrounding vehicle from a server;
    calculating, by a controller of the host vehicle, a risk level of the surrounding vehicle using the obtained additional information;
    selecting, by the controller of a host vehicle, at least one of a side mirror or a head up display (HUD);
    displaying, by the side mirror, whether the surrounding vehicle activates the autonomous mode, when the side mirror is selected; and
    displaying, by the HUD, whether the surrounding vehicle activates the autonomous mode, when the HUD is selected,
    wherein the additional information includes at least one of an accident history, an age of a driver, or a vehicle age of the surrounding vehicle.

10. The method of claim 9, wherein the selecting at least one of the side mirror or the HUD comprises:
    sensing, by a sensor device, a relative location of the surrounding vehicle with respect to the host vehicle;
    storing, by a storage, information of the relative location to be displayed on the side mirror and on a windshield; and
    determining, by the controller, a first location corresponding to the relative location of the surrounding vehicle on the side mirror or a second location corresponding to the relative location of the surrounding vehicle on the windshield.

11. The method of claim 9, further comprising:
    providing the driver of the host vehicle with a number of surrounding vehicles which are traveling in the autonomous mode, using a voice.

12. A method for providing a driver of a host vehicle with status information of a surrounding vehicle, the method comprising:
    communicating, by a vehicle to vehicle (V2V) communication device, with the surrounding vehicle and obtaining information indicating whether an autonomous mode of the surrounding vehicle is activated;
    obtaining, by a first communication device, additional information of the surrounding vehicle from a server;
    calculating, by a controller of the host vehicle, a risk level of the surrounding vehicle using the obtained additional information;
    selecting, by the controller, at least one of a side mirror or a head up display (HUD);
    displaying, by the side mirror, whether an icon indicating whether the surrounding vehicle activates the autonomous mode together with the risk level, when the side mirror is selected; and
    displaying, by the HUD, whether an icon indicating whether the surrounding vehicle activates the autonomous mode together with the risk level, when the HUD is selected,
    wherein the additional information includes at least one of an accident history, an age of a driver, or a vehicle age of the surrounding vehicle.

13. The method of claim 12, further comprising:
adjusting, by the controller, a size of the icon indicating whether the surrounding vehicle activates the autonomous mode based on the risk level.

14. The method of claim 12, further comprising:
providing, by the controller, the driver of the host vehicle with a number of surrounding vehicles which are traveling in the autonomous mode, using a voice.

* * * * *